United States Patent
Laubry et al.

(10) Patent No.: US 11,559,960 B2
(45) Date of Patent: Jan. 24, 2023

(54) TIRE WITH AN ELEMENT ATTACHED TO THE SURFACE THEREOF AND METHOD FOR ATTACHING AN ELEMENT TO THE SURFACE OF A TIRE

(71) Applicant: COMPAGNIE GENERALE DES ETABLISSEMENTS MICHELIN, Clermont-Ferrand (FR)

(72) Inventors: Philippe Laubry, Clermont-Ferrand (FR); Lionel Fagot-Revurat, Clermont-Ferrand (FR); Isabelle Aldon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 368 days.

(21) Appl. No.: 15/771,934

(22) PCT Filed: Oct. 25, 2016

(86) PCT No.: PCT/EP2016/075692
§ 371 (c)(1),
(2) Date: Apr. 27, 2018

(87) PCT Pub. No.: WO2017/072119
PCT Pub. Date: May 4, 2017

(65) Prior Publication Data
US 2018/0339475 A1  Nov. 29, 2018

(30) Foreign Application Priority Data
Oct. 28, 2015  (FR) ....................... 1560319

(51) Int. Cl.
*B60C 19/00* (2006.01)
*B29D 30/00* (2006.01)
(Continued)

(52) U.S. Cl.
CPC ............ *B29D 30/0061* (2013.01); *B60C 1/00* (2013.01); *B60C 1/0016* (2013.01); *B60C 19/00* (2013.01);
(Continued)

(58) Field of Classification Search
CPC ............ B29D 30/00; B29D 2030/0072; B29D 2030/0077; B29D 30/0061;
(Continued)

(56) References Cited

U.S. PATENT DOCUMENTS 5,971,046 A * 10/1999 Koch .................. B60C 23/0493
152/539
6,443,198 B1   9/2002 Koch et al.
(Continued)

FOREIGN PATENT DOCUMENTS

EP   0 906 839 A2   4/1999
EP   2 889 349 A1   7/2015

OTHER PUBLICATIONS

Y. Masaoka, Y. Nakagawa, T. Hasegawa, and H. Ando, "New Durable Sealant of Telechelic Polyacrylate," Journal of ASTM International 3, No. 10 (2006): 1-9 (Year: 2006).*
(Continued)

*Primary Examiner* — Cedrick S Williams
(74) *Attorney, Agent, or Firm* — Venable LLP

(57) ABSTRACT

A tire comprises an interior surface and an exterior surface, an accommodating region arranged on one of said interior and exterior surfaces, an adhesive layer arranged on the accommodating region and a member attached to the accommodating region by the adhesive layer, in which the adhesive layer is based on a silanized polyether.

10 Claims, 2 Drawing Sheets

(51) Int. Cl.
  *C09J 183/12*   (2006.01)
  *B60C 23/04*    (2006.01)
  *B60C 1/00*     (2006.01)
  *C09J 171/02*   (2006.01)
  *C08G 65/336*   (2006.01)
  *C08L 27/12*    (2006.01)
  *C08L 71/08*    (2006.01)

(52) U.S. Cl.
  CPC ........ *B60C 23/0493* (2013.01); *C08G 65/336* (2013.01); *C08L 27/12* (2013.01); *C08L 71/08* (2013.01); *C09J 171/02* (2013.01); *C09J 183/12* (2013.01); *B29D 2030/0072* (2013.01); *B60C 2019/004* (2013.01)

(58) Field of Classification Search
  CPC ............ B60C 23/0493; B60C 23/0408; B60C 23/065; B60C 19/00; B60C 19/002; B60C 2019/004
  See application file for complete search history.

(56) References Cited

U.S. PATENT DOCUMENTS

| | | |
|---|---|---|
| 6,444,069 B1 | 9/2002 | Koch et al. |
| 8,763,658 B2 | 7/2014 | Nahmias Nanni et al. |
| 9,493,692 B2 | 11/2016 | Goubard et al. |
| 9,873,822 B2 | 1/2018 | Goubard et al. |
| 2002/0091222 A1* | 7/2002 | Viegas ............... C08G 18/5027 528/75 |
| 2005/0205183 A1* | 9/2005 | Yukawa ................ B60C 19/002 152/450 |
| 2007/0171034 A1* | 7/2007 | Mancosu ........... B60C 23/0408 340/438 |
| 2011/0308705 A1* | 12/2011 | Sandstrom ......... B29D 30/0061 156/123 |
| 2012/0073717 A1* | 3/2012 | Agostini ............... B60C 19/002 152/450 |
| 2013/0048180 A1* | 2/2013 | Song ....................... C08K 3/04 152/450 |
| 2014/0261944 A1* | 9/2014 | Papakonstantopoulos .................. B60C 5/14 152/510 |
| 2015/0184045 A1 | 7/2015 | Goubard et al. |
| 2017/0050474 A1 | 2/2017 | Laubry |
| 2017/0058165 A1 | 3/2017 | Goubard et al. |
| 2017/0232806 A1* | 8/2017 | Sakamoto ............. B60C 19/003 152/152.1 |

OTHER PUBLICATIONS

EM Petrie—2010—adhesives.org, https://www.adhesives.org/docs/default-document-library/hybrid_sealants_may2010-final-(1). (Year: 2010).*

* cited by examiner

TIRE WITH AN ELEMENT ATTACHED TO THE SURFACE THEREOF AND METHOD FOR ATTACHING AN ELEMENT TO THE SURFACE OF A TIRE

FIELD OF THE INVENTION

The present invention relates to tyres, and more particularly to tyres comprising a member attached to the surface thereof.

PRIOR ART

More precisely, the invention relates to the attachment of a member, especially an electronic member, such as a pressure sensor, to a tyre. The recent development of these members is limited by the difficulty of rapidly and durably attaching an object to the surface of a tyre.

Document EP 906 839 A2 presents a tyre comprising an interior surface and an exterior surface, an accommodating region arranged on one of these interior and exterior surfaces, an adhesive layer arranged on said accommodating region and a member with a rubber attachment layer attached to the accommodating region by the adhesive layer, in which the adhesive layer is a bonding rubber which is vulcanizable at room temperature for a duration of the order of 48 to 72 hours.

However, this attachment operation is long and expensive.

BRIEF DESCRIPTION OF THE INVENTION

A subject of the invention is a similar tyre, characterized in that the adhesive layer is based on a silanized polyether.

The use of such an adhesive layer has the advantage of enabling quicker placement of the member and of not comprising any solvent or dissolution, while retaining excellent mechanical strength of the attachment.

The silanized polyether is preferably an alkoxysilane-functional telechelic polyether.

By way of example, the alkoxysilane may be methyldimethoxysilane.

The polyether may advantageously be a polyoxypropylene.

The member may be an electronic device. It may also be a casing able to receive an electronic device. The member may also be a rubber patch.

The thickness of the adhesive layer is preferentially between 1 and 1.5 mm.

Another subject of the invention is a tyre comprising two beads, two sidewalls connected to the beads, a crown connected to the ends of the two sidewalls with a crown reinforcement and a radially exterior tread, in which, the tyre having an exterior side and an interior side, the member is attached to the radially interior surface of the crown, axially on the exterior side of the tyre.

"Exterior side of the tyre" is intended to mean the side of the tyre intended to be arranged on the exterior side of the vehicle relative to the median plane of the tyre.

Advantageously, the tyre having a maximum axial width LT, the axial distance between the centre of gravity of the member and the median plane EP of the tyre is at least equal to 5% of the maximum axial width LT of the tyre.

This position makes it possible to reduce the consequences of the presence of a member on the interior surface of the tyre under conditions of very high running speed and with an imposed camber.

Preferably, the axial distance between the centre of gravity of the member and the median plane EP of the tyre is at most equal to 25% of the maximum axial width LT of the tyre.

This makes it possible to avoid the shoulder region of the tyre, which is always under high load.

Very advantageously, the tread comprising a set of circumferential grooves, the centre of gravity of the member is located in line with a circumferential groove of the tyre tread.

This position facilitates the removal of heat associated with the presence of the member during running.

"Groove" is intended to mean any recessed region of the tread that is circumferential overall and overall makes a complete circuit of the tyre, delimited by walls of material that face one another and are distant from one another by a non-zero distance, with a depth of at least 2 mm when the tyre is new. These walls cannot come into contact with one another under normal running conditions. A circumferential groove has two walls of circumferential overall direction, one axially on the inside and the other axially on the outside.

"Positioning in line with the circumferential groove" is intended to mean that the centre of gravity of the member is axially on the outside of the axially inside wall of the groove and axially on the inside of the axially outside wall of the groove, with a 5 mm tolerance on the axial positioning.

According to an advantageous embodiment, the centre of gravity of the member is situated radially in line with a rib of the tread. This is because, under high load, the initial deflections of the crown are located not under the ribs but under the grooves. These deflections generate significant deformation which could damage the adhesive layer between the inner liner and the member. In this case, positioning the member in line with a rib improves the endurance of the adhesive layer and therefore of the tyre.

"Rib" is intended to mean a raised element on a tread, this element extending in the circumferential direction and overall making a complete circuit of the tyre, having a height at least equal to 2 mm when the tyre is new. A rib comprises two axial walls and a contact face, the latter being intended to come into contact with the ground during running. A circumferential rib has two walls of circumferential overall direction, one axially on the inside and the other axially on the outside. It is possible for a rib not to be circumferentially continuous but to be notched, especially in the case of a tyre intended for winter use.

"Positioning in line with the rib" is intended to mean that the centre of gravity of the member is axially on the outside of the axially inside wall of the rib and axially on the inside of the axially outside wall of the rib, with a 5 mm tolerance on the axial positioning.

According to another subject, the invention relates to a process for attaching a member with a rubber attachment layer to an accommodating region of one of the interior and exterior surfaces of a tyre, in which:

- an adhesive layer based on silanized polyether is applied to the accommodating region and/or to the exterior surface of the rubber attachment layer of the member;
- the member is placed against the accommodating region; and
- the adhesive layer is allowed to crosslink.

Advantageously, before placing the member on the accommodating region of the surface of a vulcanized tyre, said accommodating region is cleaned.

This cleaning may be carried out by brushing or by a high-pressure water jet or by a laser beam.

This treatment makes it possible to remove the majority of the mould-release agents used and thereby enables durable adhesive bonding of the member to the surface of the tyre.

According to another embodiment, a film for protecting the accommodating region is placed on the accommodating region of the tyre before the tyre is vulcanized, and this film for protecting the accommodating region is removed before applying an adhesive layer based on silanized polyether to the accommodating region and/or to the radially exterior surface of the member.

Preferably, the protective film is a thermoplastic film selected such that the force of peeling said film from the accommodating region is less than 1 N/mm at 20° C., and preferentially less than 0.5 N/mm.

Preferentially, the protective film is selected from the group consisting of polyesters and films comprising at least one fluoropolymer.

By way of example, the fluoropolymer may comprise a fluorinated ethylene/propylene (FEP) copolymer.

Advantageously, the Tg (or M.p., if appropriate) of the protective film is greater than the maximum curing temperature of the rubber compound of the accommodating region.

According to a preferential embodiment, the adhesive layer is applied by spraying.

DETAILED DESCRIPTION OF THE INVENTION

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Adhesive Based on Silanized Polyether

The applicants have discovered that the use of a novel adhesive family based on silanized polyether makes it possible to improve the adhesive bonding of a member to an interior or exterior surface of a tyre.

The adhesives used are based on polyoxypropylenes, methoxysilane-functionalized at the chain end:

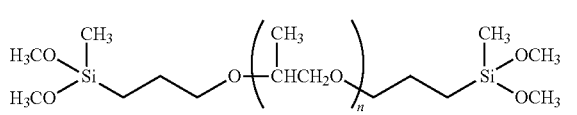

A high-weight polyoxypropylene is first functionalized with an allyl group at each of the two chain ends, then is hydrosilylated in order to ultimately obtain a methyldimethoxysilane-functional telechelic polyether.

These polymers combine relatively well the advantages of silicones (ageing resistance) and of polyurethanes (cohesion of the material). They are free of isocyanate and of solvent.

A typical formulation of an adhesive or sealant based on silanized polyether may contain, in addition to the functional polyether: filler(s), plasticizer, pigment, adhesion promoter, dehydrating agent, catalyst, thixotropic agent and optionally antioxidant and/or UV stabilizer depending on the use.

One formulation example (Kaneka DKB-5 sealant)[1] is presented in the following table:

| Type of component | Nature of the component | phr | pcm |
|---|---|---|---|
| Silanized polyether (STPE) | S303H (Kaneka Corporation) | 100 | 33 |
| Filler | Calcium carbonate (CaCO$_3$) | 120 | 40 |
| Plasticizer | Di-iso-undecyl phthalate (DIUP) | 50 | 16.6 |
| Pigment | White titanium oxide (TiO$_2$) | 20 | 6.6 |
| Thixotropic agent | Polyamide wax or fumed silica | 5 | 1.7 |
| Dehydrating agent | Vinyltrimethoxysilane | 2 | 0.7 |
| Adhesion promoter | N-2-aminoethyl-3-aminopropyltrimethoxysilane | 3 | 1 |
| Curing catalyst | Dibutyltin bis(acetylacetonate) | 1.5 | 0.5 |
| Total | | 301.5 | 100 |

[1] CABOT - CAB-O-SIL TS-720 in MS-Polymer Sealants (2010)
phr: parts by weight per 100 parts of elastomer, in this case the silanized polyether;
pcm: percentage by weight relative to 100 g of adhesive.

After application of the adhesive based on silanized polyether (silyl-terminated polyether or STPE), the latter polymerizes with the moisture from the air[2].

[2] CRAY VALLEY—One-component Moisture Curing Methoxysilane Sealants (2001)

This polymerization is carried out in two steps:
Step 1: Conversion of the Methoxysilane to Silanol by Hydrolysis:

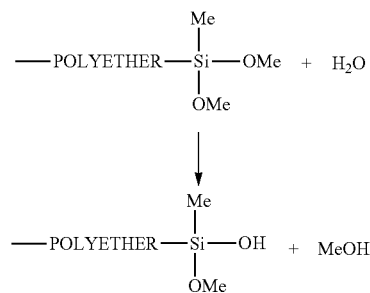

Step 2: Condensation of the Silanol with a Methoxysilane in Order to Form a Siloxane Bridge:

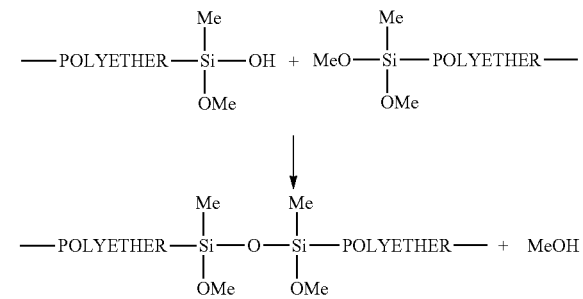

Adhesives based on silanized polyether are available commercially, especially from Bostik: BOSTIK-Simson-ISR-7003, this is a one-component adhesive.

The use of such an adhesive has the advantage of not using any solvent or any dissolution and of having much quicker crosslinking kinetics than a customary cold-vulcanizing bonding rubber layer, such as Gray-Gum supplied by Tech International, while having excellent mechanical strength. This bonding rubber requires the use of a dissolution ("vulcanization chemical fluid") which comprises a vulcanization ultra-accelerator and which has to be applied after preparation of the surfaces to be adhesively bonded.

Three main parameters are involved in the crosslinking kinetics of the cited Bostik adhesive: temperature, hygrometry and thickness.

Considering the standard conditions of hygrometry (50% relative humidity) and a temperature of 23 degrees Celsius, a 0.3-0.4 mm thick layer of bonding rubber will crosslink in approximately forty hours whereas a 1 mm thick adhesive layer of the cited Bostik adhesive will crosslink in under six hours. At a temperature of 35 degrees Celsius and 80% relative humidity, the crosslinking time is reduced by a factor of two.

This is a very significant reduction for the ease of use of the adhesive layer for attaching a member after the vulcanization of a tyre.

The cited Bostik adhesive also has a glass transition temperature Tg of −67° C. after crosslinking. This enables it to have no problems of breaking under cold conditions and of remaining very effective over the whole temperature range used in running.

Rubber Compound

The part of the tyre to which the member according to the invention is attached, and also the rubber attachment layer of the member, are rubber compositions based on at least one essentially unsaturated diene elastomer, on at least one essentially saturated diene elastomer or else on a mixture of these two types of elastomers. The rubber compositions may also be based on, or comprise, rubbers such as EPMs or ethylene/propylene monomer rubbers. The rubber compositions also customarily contain fillers such as carbon black or silica, and also conventional additives and especially agents which protect against ozone, oxidation, etc.

"Diene" elastomer is intended to mean, in a known way, an elastomer resulting at least in part (i.e., a homopolymer or a copolymer) from diene monomers (monomers bearing two conjugated or non-conjugated carbon-carbon double bonds). These diene elastomers can be classified into two categories: "essentially unsaturated" or "essentially saturated".

"Essentially unsaturated" diene elastomer is generally intended to mean a diene elastomer resulting at least in part from conjugated diene monomers having a content of units of diene origin (conjugated dienes) which is greater than 15% (mol %).

Thus, for example, diene elastomers such as butyl rubbers or copolymers of dienes and of α-olefins of EPDM (ethylene/propylene/diene terpolymer) type do not fall within the above definition and can especially be described as "essentially saturated" diene elastomers (low or very low content of units of diene origin, always less than 15%).

According to one embodiment of the invention, the part of the tyre to which the member according to the invention is attached is the sidewall of the tyre. The composition of this part of the tyre may then contain at least one essentially saturated diene elastomer, in particular at least one EPDM copolymer, whether or not this copolymer is, for example, used in a mixture with one or more essentially unsaturated diene elastomers.

According to another embodiment of the invention, the part of the tyre to which the member according to the invention is attached is a tyre inner liner or any other layer or object of the inner portion of the tyre. The appended figures illustrate this embodiment, and more particularly attachment of the member under the tyre tread. The composition of this part of the tyre may then contain at least one essentially saturated diene elastomer of isobutene/isoprene copolymer type (butyl rubber), and also the halogenated versions of these copolymers.

DESCRIPTION OF THE FIGURES

Supplementary elements of the invention are now described with the help of the appended drawing, presented nonlimitingly, in which:

FIG. 1 schematically represents a radial section through a pneumatic tyre or tyre incorporating, at a given accommodating region 13, a protective film 12 according to one embodiment of the invention.

This tyre 1 has a crown 2 reinforced by a crown reinforcement or belt 6, two sidewalls 3 and two beads 4, each of these beads 4 being reinforced with a bead wire 5. The crown reinforcement 6 is surmounted radially on the outside by a rubber tread 9. A carcass reinforcement 7 is wound around the two bead wires 5 in each bead 4, the turn-up 8 of this reinforcement 7 being, for example, arranged towards the exterior of the tyre 1. The carcass reinforcement 7 is, in a way known per se, composed of at least one ply reinforced by "radial" cords, for example of textile or metal, that is to say that these cords are arranged virtually parallel to one another and extend from one bead to the other so as to form an angle of between 80° and 90° with the median circumferential plane (plane perpendicular to the axis of rotation of the tyre which is situated equidistantly from the two beads 4 and passes through the middle of the crown reinforcement 6). An airtight layer 10 (or "inner liner") extends from one bead to the other radially on the inside with respect to the carcass reinforcement 7. FIG. 1 also indicates the median plane EP of the tyre. The median plane is a plane perpendicular to the axis of rotation of the tyre which is located halfway between the two beads and passes through the middle of the crown reinforcement. This figure also indicates the maximum axial width of the tyre LT. This maximum axial width is measured at the sidewalls, the tyre being mounted on its rim and lightly inflated, i.e. inflated to a pressure equal to 10% of the nominal pressure as recommended, for example, by the Tire and Rim Association or TRA.

The tyre 1 is such that its inner wall comprises a given accommodating region 13 covered radially on the inside by a protective film 12.

The surface of the accommodating region 13 must be sufficient to obtain robust attachment of the member; those skilled in the art will know how to adjust the dimensions of the protective layer 12 as a function of the size and weight of the member to be attached.

The detachable protective film 12 is a thermoplastic film comprising, by way of example, a fluoropolymer. The thermoplastic film is extendable, with low rigidity, and has plastic behaviour. This film must have a Tg (or M.p., if appropriate) greater than the vulcanization temperature of the pneumatic tyre. An example of a suitable film is the A5000 film from Aerovac Systèmes France. This film comprises a fluorinated ethylene/propylene or FEP copolymer. This film has a maximum usage temperature of the order of 204° C. and an elongation at break of greater than 300%. The thickness thereof is 25 μm. These features enable it, in an exemplary embodiment of the invention, to be put in place directly or on the building drum of the pneumatic tyre.

Figure 2:
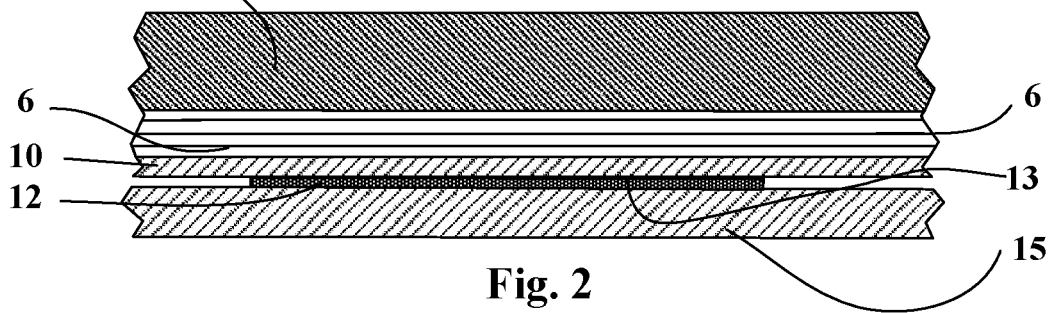
FIG. 2 presents, in partial radial section, a tyre blank in accordance with one embodiment of the invention.

As indicated in FIG. 2, the detachable protective film 12 makes it possible to save the accommodating region 13 from any contact with the building drum of the tyre then with the curing membrane of the vulcanization mould. The particular nature of this protective film enables it to be removed from the interior surface of the tyre after vulcanization. The removal of this protective film restores all the properties to the surface of the accommodating region of the tyre. The protective film 12 may be removed without tearing.

Figure 1:
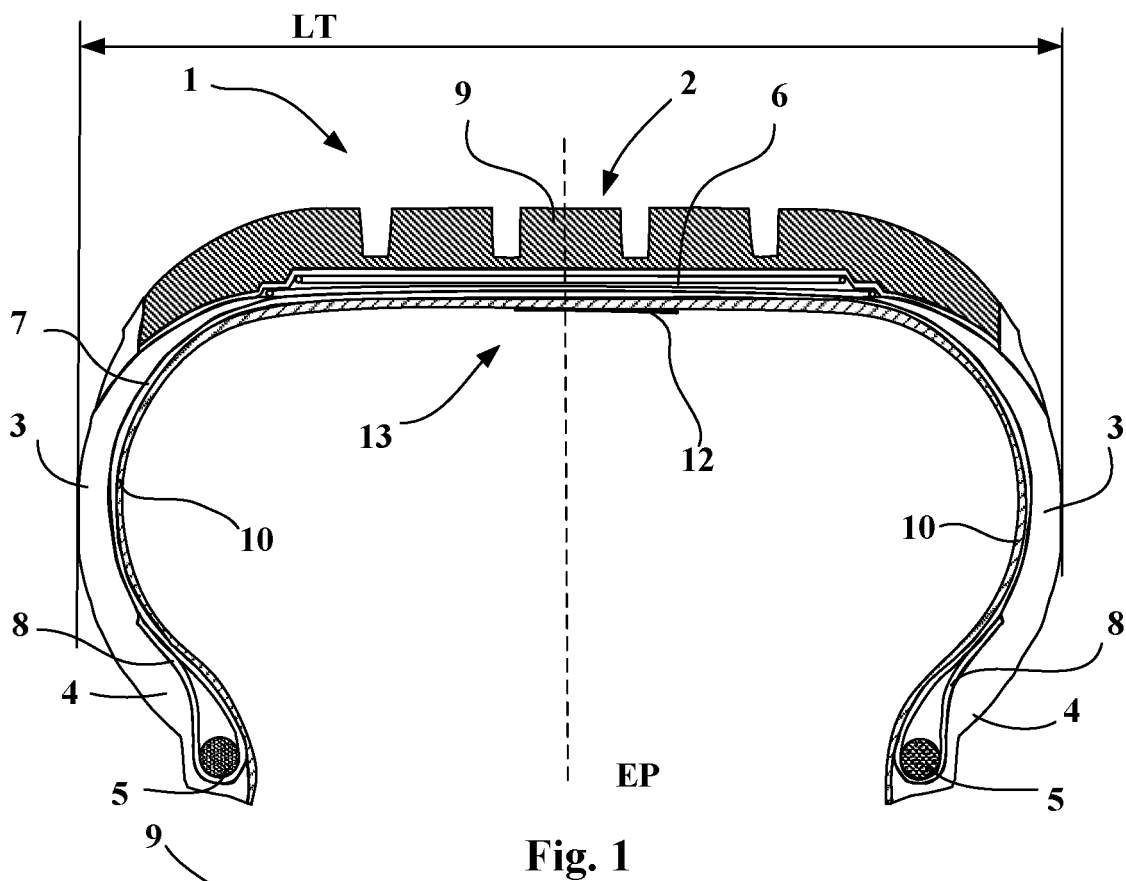
FIG. 1 very schematically shows a radial section through a tyre in accordance with one embodiment of the invention.

The pneumatic tyre or tyre of FIG. 1 may be manufactured, as indicated in FIG. 2, by integrating the protective film into an unvulcanized blank of the tyre 1 using a building drum and the other techniques customary in the manufacture of pneumatic tyres. More specifically, the detachable protective film 12 arranged radially innermost is applied first to the building drum 15. All the other customary components of the pneumatic tyre are then successively applied.

After shaping, the crown plies and the tread are applied to the tyre blank. The blank completed in this way is placed in a curing mould and vulcanized. During vulcanization, the protective film protects the curing membrane of the mould from any contact with the accommodating region 13.

Upon removal from the curing mould, the protective film 12 is still attached to the accommodating region 13.

The protective film 12 may be easily removed upon removal from the vulcanization mould of the tyre. It is also possible, and preferable, to leave this protective film in place until the member is attached.

The protective film may also be applied to the chosen accommodating region 13 on the surface of the tyre after the shaping of the tyre blank and before the introduction thereof into the vulcanization mould.

Figure 3:
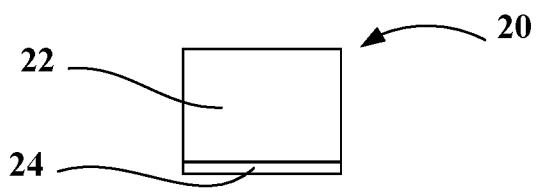
FIG. 3 illustrates a member with an attachment layer.

FIG. 3 schematically presents a member 20 comprising a casing 22 and an attachment layer 24. The material of the attachment layer 24 is a rubber compound. Those skilled in the art will know how to adapt the thickness of the attachment layer as a function of that of the adhesive layer and of the size and weight of the member.

FIG. 1 thus presents a tyre 1 ready to receive a member.

It is also possible to attach a member to an accommodating region 13 of a customary vulcanized tyre, that is to say without it comprising a protective film protecting the accommodating region.

In this case, it is preferable to clean this accommodating region before attaching the member.

This cleaning may be carried out, for example, by means of a high-pressure water jet. This cleaning makes it possible to remove the majority of the mould-release agents which were placed on this surface before the vulcanization of the tyre, to facilitate the detachment of the curing membrane of the tyre vulcanization mould.

After cleaning, the surface of the accommodating region of the inner liner is dried.

It is also possible to carry out this cleaning by brushing, or with a laser beam.

Figure 4:
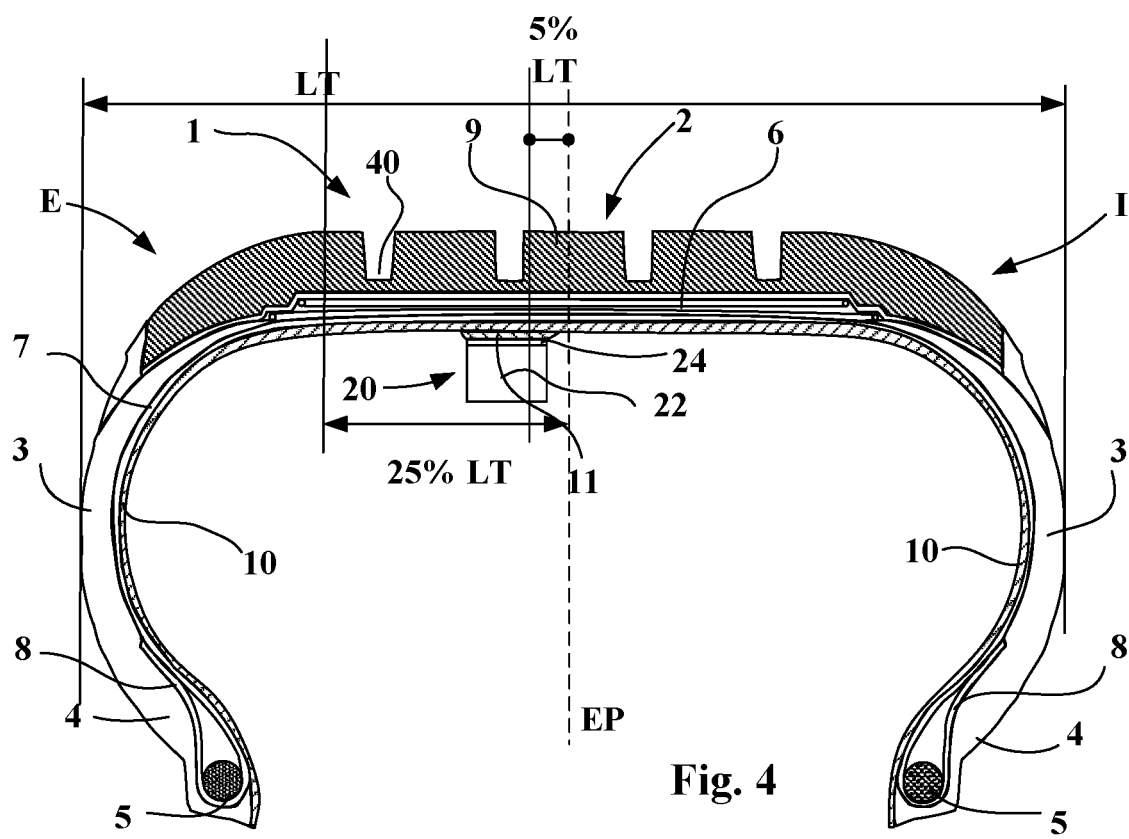
FIG. 4 shows the member attached to the surface of the tyre.

FIG. 4 presents the assembly of the tyre of FIG. 1 and the member 20 attached to the inner surface thereof, on the inner liner. This tyre is characterized in that the adhesive layer 11 is based on a silanized polyether. The adhesive layer holds the member 20 in place.

The member 20 is attached to the surface of the tyre easily and rapidly: After having removed the protective film 12 from the accommodating region 13 of the tyre 1, if necessary:

an adhesive layer based on silanized polyether is applied to the surface of the accommodating region; application of the adhesive by spraying is also possible: in this case it may be carried out at a higher temperature to support the spraying technique (reduction in the viscosity of the adhesive);

the attachment layer of the member is placed against the surface of the adhesive layer 11, preferably with a suitable contact pressure;

the adhesive layer is then allowed to crosslink at room temperature, as has been described above.

The crosslinking of the adhesive layer creates two high-quality bonds: between the adhesive and the inner liner on the one hand, and between the adhesive and the rubber attachment layer of the member on the other hand. The quality of these bonds is linked to an interpenetrating network originating from the polycondensation of the alkoxysilane-functional oligomers.

Indeed, the macromolecular chains of the rubber compounds and of the silanized polyether adhesive are partially compatible, which enables intermolecular diffusion between the macromolecular chains to occur when the adhesive layer is brought into contact against the inner liner and the attachment layer of the member.

Moreover, this diffusion is promoted on the one hand by the good mobility of the (not yet crosslinked) silanized polyether and on the other hand by the presence of small molecules such as the adhesion promoter, the dehydration agent and even the plasticizer (the three acting as a pseudo-solvent). Although it is only very superficial, this intermolecular diffusion is capable of ultimately generating an interpenetrating network after crosslinking of the silanized polyether. This entanglement of the molecules of each of the materials, with disappearance of the interface and creation of an interphase over a small thickness, must be responsible for the good adhesion which is observed and measured.

In the example presented, the member is attached to the inner surface of the tyre; it is also possible to place it on an outer surface of the tyre, for example on the tyre sidewall.

The surfaces of the accommodating region 13 and hence of the adhesive layer 11 must be sufficient to obtain robust attachment of the member; those skilled in the art will know how to adjust the dimension of the adhesive layer 11 as a function of the size and weight of the member to be attached.

Tests

The benefit of the adhesive according to one of the subjects of the invention is shown by the results of a very high-speed resistance test.

The tyres in question are of dimension 305/30ZR20 103Y, with an interior side I and an exterior side E, with a maximum axial width of 313 mm, and are tested with a camber angle of 2.5° in order to take into account the technical requirements of a vehicle for which they are specifically intended. The test consists in running on a metal rolling road 8.5 m in circumference, at a set pressure of 3.2 bar and a set load of 587 daN. The tyre runs at levels of increasing speed, lasting 20 minutes each, the speed increment being 10 km/h. The tyres are classified according to the maximum speed achieved and the length of running at the last speed level achieved.

In this test, the member is a pressure and temperature sensor placed in a casing made of rubber compound based on cis-1,4-polybutadiene and on halogenated butyl, as described in document U.S. Pat. No. 8,763,658 B2.

A comparison is made between a tyre not fitted with a member, a tyre with a member attached with a 0.3-0.4 mm thick adhesive layer of Gray-Gum supplied by Tech International and a tyre with a member attached with an approximately 1 mm thick adhesive layer of Bostik-Simson-ISR-7003.

The tyre without the member reached the level of 370 km/h and ran at this speed for 11 minutes. The tyre according to the prior art, namely equipped with the electronic member, a pressure sensor weighing 7 g, positioned according to the prior art and therefore installed in the tyre in such a way that its centre of gravity is in the equatorial plane, to within the positioning tolerance of 1% of the maximum axial width, achieved the speed level of 340 km/h and failed after running under these conditions for one minute. This result, when compared with that of the tyre not fitted with the electronic member, demonstrates the drop in endurance performance at very high speed caused by the presence of the electronic member. This failure is linked to the approximately 15° C. increase in crown temperature seen by numerical simulation in line with the sensor, this being at the same speed on the tyre not fitted with an electronic member and on the tyre fitted with the electronic member according to the prior art.

Figure 5:
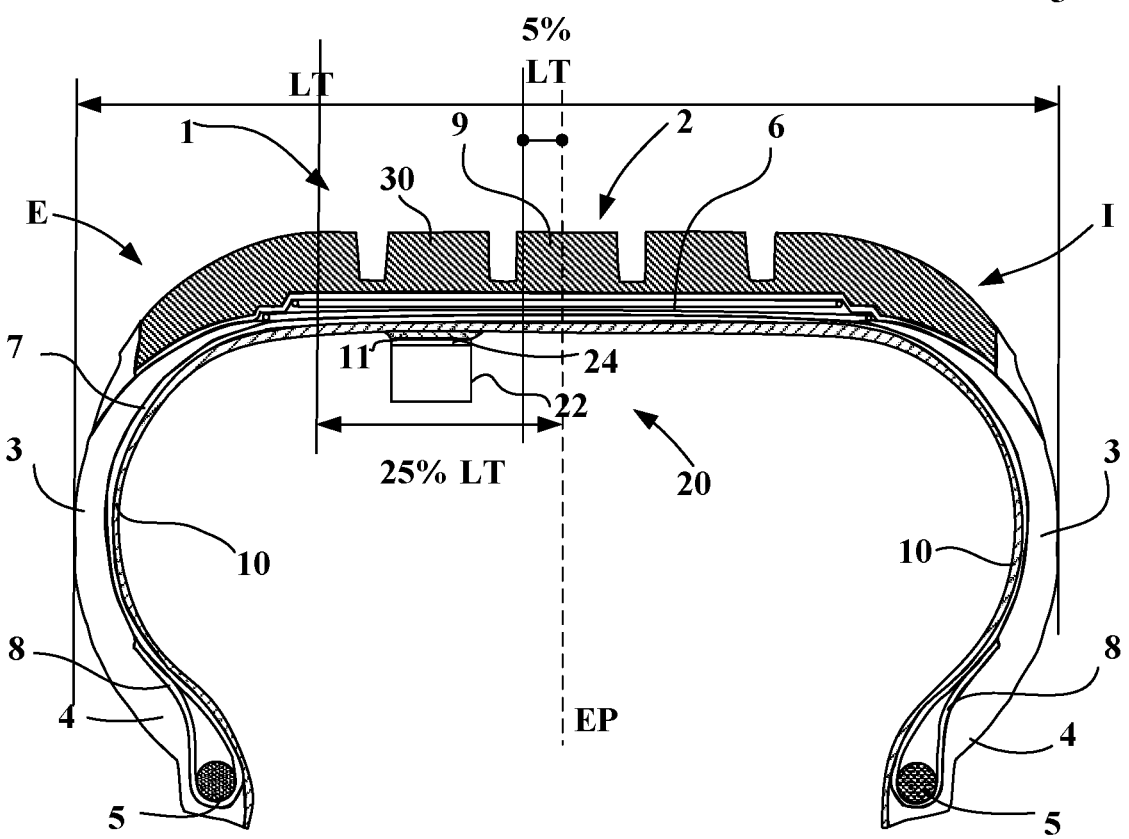
FIG. 5 shows the member attached to the surface of the tyre at another preferential position.

The inventors tested two embodiments of the invention. The first embodiment, illustrated in FIG. 5, consisted in installing the electronic member 20 at a distance from the equatorial plane of 16% of the maximum axial width LT, in line with a rib 30 of the tread 9. In this case, the tyre according to the invention achieved the speed level of 360 km/h and ran for 15 minutes at this level. This, when compared to the result of the tyre fitted with the electronic member positioned in the equatorial plane, namely the maximum achieved level of 340 km/h, demonstrates the improvement in high-speed endurance of the tyre fitted with the electronic member as described by the invention.

The second embodiment, illustrated in FIG. 4, consisted in installing the electronic member 20 at a distance from the equatorial plane of 7% of the maximum axial width, in line with a groove 40 of the tread 9. In this case, the tyre according to the invention achieved the speed level of 370 km/h and ran for 15 minutes at this level. The maximum crown temperature dropped by almost 15° C. This result, when compared to the result of the tyre fitted with the electronic member positioned in the equatorial plane, namely the maximum achieved level of 340 km/h, shows the improvement in high-speed endurance of the tyre fitted with the electronic device as described by the invention according to this second embodiment.

No difference in performance was observed between the two adhesive layers tested. However, a supplementary test using a cyanoacrylate-based adhesive showed that the latter is unsatisfactory.

These results show that the use of an adhesive layer based on silanized polyether is a beneficial alternative to the use of a conventional bonding rubber such as Gray-Gum from Tech International.

The invention claimed is:

1. A tire comprising:
two beads;
two sidewalls connected to the beads;
a crown connected to the ends of the two sidewalls with a crown reinforcement;
a radially exterior tread;
a radially interior surface;
an accommodating region arranged on the radially interior surface;
a detachable protective film comprising a fluoropolymer, the detachable protective film radially covering the accommodating region to avoid any contact of the accommodating region during vulcanization of the tire;
an adhesive layer arranged on said accommodating region upon removal of the detachable protective film after vulcanization of the tire; and
a member consisting of only one assembly, the assembly comprising a rubber attachment layer attached to said accommodating region by said adhesive layer,
wherein a force of peeling the detachable protective film from the accommodating region is less than 1 N/mm at 20° C.,
wherein said adhesive layer is based on a silanized polyether and is free of isocyanate,
wherein the rubber attachment layer is based on at least one essentially unsaturated diene elastomer, at least one essentially saturated diene elastomer or a mixture thereof,
wherein, the tire having a maximum axial width LT, an axial distance between a center of gravity of the member and a median plane EP of the tire is at least equal to 5% and at most equal to 25% of the maximum axial width LT of the tire, and
wherein the member is attached to the radially interior surface opposite of the radially exterior tread, axially on an exterior side of a vehicle relative to the median plane EP of the tire.

2. The tire according to claim 1, wherein the silanized polyether is a polyoxypropylene.

3. The tire according to claim 1, wherein the member is a casing able to receive an electronic device.

4. The tire according to claim 1, wherein the member is an electronic device.

5. The tire according to claim 1, wherein the member is a rubber patch.

6. The tire according to claim 1, wherein a thickness of said adhesive layer is between 1 and 1.5 mm.

7. The tire according to claim 1, wherein the radially exterior tread comprises a set of circumferential grooves, and the center of gravity of the member is located in line with a circumferential groove of the tire tread.

8. The tire according to claim 1, wherein the radially exterior tread comprises a set of ribs, and the center of gravity of the member is located in line with a rib of the tire tread.

9. The tire according to claim 1, wherein the silanized polyether is an alkoxysilane-functional telechelic polyether.

10. The tire according to claim 9, wherein the alkoxysilane is methyldimethoxysilane.

* * * * *